United States Patent [19]

Ehrich

[11] Patent Number: 5,214,585
[45] Date of Patent: May 25, 1993

[54] BALANCING METHOD AND PRODUCT

[75] Inventor: Fredric F. Ehrich, Marblehead, Mass.

[73] Assignee: General Electric Company, Cincinnati, Ohio

[21] Appl. No.: 374,210

[22] Filed: Jun. 30, 1989

[51] Int. Cl.$^5$ .......................................... G01M 1/38
[52] U.S. Cl. ..................... 364/463; 73/462; 364/503; 364/578
[58] Field of Search ................ 73/460, 461, 462, 469, 73/470; 364/463, 508, 578

[56] References Cited

U.S. PATENT DOCUMENTS

| | | | |
|---|---|---|---|
| 2,966,801 | 1/1961 | Nemec et al. | 73/462 |
| 3,071,972 | 1/1963 | Koenig | 73/462 |
| 3,122,020 | 2/1964 | Hack | 73/462 |
| 3,916,495 | 11/1975 | Klassen et al. | 29/156 |
| 4,098,127 | 7/1978 | Shiga et al. | 73/462 |
| 4,132,090 | 1/1979 | McDermott | 64/9 R |
| 4,162,634 | 7/1979 | Hofmann | 73/462 |
| 4,170,896 | 10/1979 | Korkosz | 73/66 |
| 4,238,960 | 12/1980 | Curtis et al. | 73/462 |
| 4,250,555 | 2/1981 | Mitchell et al. | 364/571 |
| 4,357,832 | 11/1982 | Blackburn et al. | 73/462 |
| 4,485,678 | 12/1984 | Fanuele | 73/660 |
| 4,489,606 | 12/1984 | Shiohata et al. | 73/462 |
| 4,535,411 | 8/1985 | Blackburn et al. | 364/508 |
| 4,543,463 | 9/1985 | Scuricini | 219/121 |
| 4,545,021 | 10/1985 | Suzuki et al. | 364/571 |
| 4,626,147 | 12/1986 | Nystuen et al. | 73/462 X |

OTHER PUBLICATIONS

ASME, *Rotating Machinery Dynamics, Volume One*, 1987, pp. 175-181, paper entitled "Supercritical Shafting for an Advanced Turboprop Engine" by P. D. Hylton et al.
*Standard Handbook for Mechanical Engineers*, T. Baumeister, 1967, pp. 5-96 through 5-101.
*Balancing Technology*, H. Schneider, 1977, pp. cover, III, V, 26-37, 42-45, 58-77, and 120-121.
GE Shaft A, General Electric Company, one-page excerpt, "[Note] 7, Dynamic Balance of Shaft Assembly," Internal, unpublished.
GE Shaft B, General Electric Company, three-page excerpt, "Balance Procedure for Shaft," Internal, unpublished.
GE Shaft C, General Electric Company, one-page excerpt, "Balance Procedure," Internal, unpublished.
"Engine Vibration Rotor Balancing," J. K. Sevcik, 1957, Internal General Electric Company document DF57AGT654, pp. cover, 1-38, unpublished.

*Primary Examiner*—Edward R. Cosimano
*Attorney, Agent, or Firm*—Jerome C. Squillaro; Nathan D. Herkamp

[57] ABSTRACT

A low-speed balancing method is provided for balancing a rotor to introduce balance corrections for reducing unbalance due to operation of the rotor at or near critical speeds without actually balancing the rotor at such critical speeds. The method is applicable for balancing a rotor in three, four or more correction planes by utilizing combinations of generic unbalance distributions of the rotor and predetermined mode shapes of the rotor at critical speeds. A simple method is presented which allows an operator using a low-speed balancing machine to determine measured corrections applicable to two planes of the rotor and then the operator effects at least a third correction to the rotor which is proportional to the measured corrections and the unbalance/mode shape combination. The operator then repeats the low-speed balancing sequence to determine final corrections at the two planes, which are then made for finally balancing the rotor.

41 Claims, 10 Drawing Sheets

BALANCING METHOD AND PRODUCT

BACKGROUND OF THE INVENTION

The present invention relates generally to balancing of rotors and, more specifically, to low-speed balancing of a rotor for a gas turbine engine, for example, for obtaining improved high-speed balance of the rotor.

A low-speed rotating machine is defined as a system having a rotor which operates well below its first flexural critical speed (i.e. sub-critically). It is well known in the art that such rotors may then be balanced before operation in conventional low-speed or two-plane balance machines. Since their rotors never run fast enough to experience any major vibratory flexure due to resonance, the low-speed balance procedure is also referred to as rigid-body balancing.

A conventional low-speed balancing procedure involves supporting the rotor on two soft-mounted slave bearings in a low-speed balance machine, each bearing being equipped with a displacement transducer which can detect the motion at that bearing induced by a rotating unbalance. The machine may then be calibrated by imposing known unbalances on the rotor. Then balance correction for the unknown unbalance distribution on any particular rotor may effectively be specified as two balance correction vectors, one in each of two preselected balance correction planes.

Of course, the terms "unbalance" and "balance" are used conventionally and as used herein are terms of degree. The degree of balance is selected for obtaining ideally no unbalance, or relatively little unbalance, in accordance with conventional practice.

A balance correction vector is defined by a specified mass or weight at a specified radial distance from the rotational centerline (stated, in combination, in units of gram-inches or the equivalent), at a specified angular (or "o'clock") position from some preselected reference point. The actual balance correction is then accomplished by removal of appropriate material at the proper radial and angular position at each of the two balance correction planes or, alternatively, addition of material at an angular location 180° away from the specified location for material removal. Two-plane balance is the necessary and sufficient criterion for low-speed rigid-body balancing.

A rotor that runs to trans-critical or supercritical high speed (i.e. in the vicinity of or through and above a flexural critical speed which induces resonance) will require considerably more complex and refined balance, since the vibratory flexure of the rotor itself will further displace the unbalances from the rotor's rotational centerline and result in amplified excitation and vibratory response during operation at or near the critical speed(s). Each critical speed has associated with it a unique and different natural or critical mode shape, so that operation at or near each critical speed requires a unique and different two-plane balance correction. Accordingly, whereas low speed rotors can be fully balanced in two correction planes, rotors operating up to or through a single critical speed should be balanced in four planes; rotors operating up to or through two critical speeds should be balanced in six planes; and, in general, rotors operating up to or through N critical speeds should be balanced in $2(N+1)$ planes. This procedure is referred to as multi-plane or high-speed or modal balancing, and is conventional.

Fundamental to this requirement is the necessity of actually operating the rotor, in the course of its being balanced, at or near each of the N critical speeds (as well as at low speed) to collect the $(N+1)$ sets of bearing reaction data. These data are then resolved mathematically into a specification of balance correction to be made at each of the $2(N+1)$ balance correction planes.

In practice, this balancing procedure is often done in situ, when the machine is first installed or is undergoing periodic overhaul or repair. If access to the balance correction planes is impractical in situ, then the rotor may be balanced in a component rig. But there are significant problems of feasibility and cost to be overcome in component test, particularly with high powered machinery. A basic need arises to accomplish the beneficial effects of high-speed balancing without actually having to operate the rotor at high speed in the course of the balancing operation.

OBJECTS OF THE INVENTION

Accordingly, it is one object of the present invention to provide a new and improved method of balancing a rotor.

Another object of the present invention is to provide an improved balancing method which is effective for reducing high-speed unbalance by balancing with an improved low-speed balancing method.

Another object of the present invention is to utilize generic unbalances and mode shapes of a rotor in low-speed balancing of the rotor for improving high-speed balance.

Another object of the present invention is to provide improved high-speed balance of a rotor by utilizing conventional low-speed balancing equipment.

Another object of the present invention is to provide new and improved rotors balanced in accordance with the improved balancing method.

SUMMARY OF THE INVENTION

The invention in a preferred embodiment includes a low-speed method of balancing a rotor which includes using a low-speed balancing sequence for determining first values of measured balance corrections applicable to the rotor at first and second correction planes for balancing measured unbalance of the rotating rotor at a test speed;

effecting at a third correction plane a third correction to the rotor which is a predetermined proportion of at least one of the first values of the first and second measured corrections, the proportion being predetermined to correct for a predetermined unbalance of the rotor for a predetermined mode shape of the rotor associated with a speed of the rotor greater than the test speed without actually rotating the rotor to the greater speed to measure unbalance;

repeating the low-speed balance sequence for the rotor having the third correction to determine second values of the first and second measured corrections at the first and second correction planes; and effecting the first and second measured corrections to the rotor at the first and second correction planes.

In exemplary embodiments of the invention the method is applied for three-plane and four-plane balancing of the rotor.

The invention also includes a rotor balanced in accordance with the method of the invention.

BRIEF DESCRIPTION OF THE DRAWING

The novel features believed characteristic of the invention are set forth in the claims. The invention, in accordance with preferred, exemplary embodiments, together with further objects and advantages thereof, is more particularly described in the following detail description taken in conjunction with the accompanying drawing in which:

DETAIL DESCRIPTION

Figure 1:
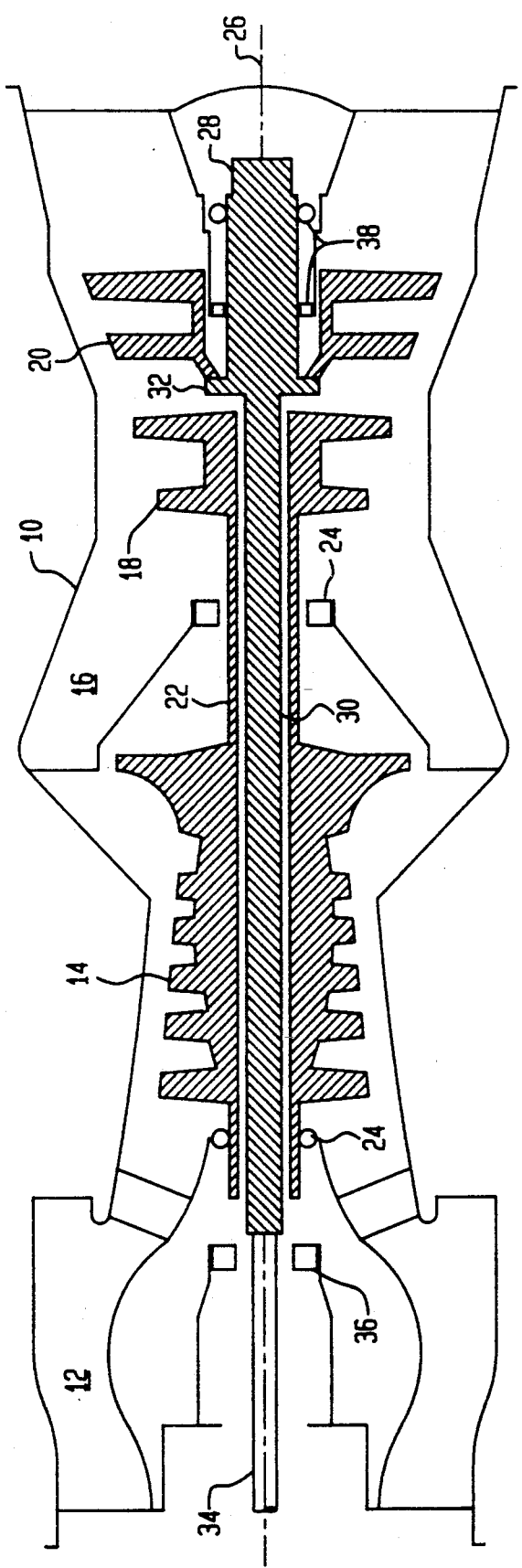
FIG. 1 is a schematic representation of a gas turbine engine including a rotor balanced in accordance with a preferred embodiment of the present invention.

Illustrated in FIG. 1 is a schematic diagram of an exemplary gas turbine engine 10. The engine 10 includes a conventional inlet 12 followed in turn by a conventional axicentrifugal compressor 14, combustor 16, a two-stage high-pressure turbine (HPT) 18, and a two-stage low-pressure turbine (LPT) 20.

The HPT 18 drives the compressor 14 and both are fixedly connected to a shaft 22, which is supported at two ends in bearings 24 for rotation about an axis of rotation, or rotational centerline, 26 of the engine 10.

The LPT 20 is fixedly connected to a rotor 28, which includes a hollow drive shaft 30, at an annular flange 32 at one end thereof. The opposite end of the drive shaft 30 is joined to an output shaft 34, which is connectable to a driven member such as a propeller or helicopter rotor (not shown). Drive shaft 30 is disposed concentrically within the shaft 22 and is supported at a forward end by a first bearing 36 and at an aft end by a second bearing 38, which in the embodiment illustrated comprises a pair of bearings spaced from each other. The drive shaft 30 is supported in the first and second bearings 36 and 38 for rotation about the axis of rotation 26.

The drive shaft 30 is a long, slender shaft which operates at rotational speeds, including supercritical speeds, up to about 22,000 rpm. Such relatively high speeds require balancing of the rotor 28 to ensure acceptable performance.

The rotor 28 may be conventionally balanced using conventional low-speed balance equipment. However, since the shaft 30 is relatively long and slender, and since operation of the rotor 28, in the embodiment illustrated, includes supercritical speeds that induce vibratory flexure of the shaft 30, conventional low-speed balancing cannot accommodate such vibratory flexure.

The present invention comprises a low-speed balancing method which permits high-speed multi-plane (i.e. three or more plane) balance correction to be made on rotors in simple conventional low-speed balance machines, without the requirement of operating them at high speed in situ or in complex and expansive component rigs. The method accomplishes most of the benefits of actual high-speed or modal or true multi-plane balancing without the attendant expense and complication. This is accomplished by utilizing other data on the particular rotor's generic dynamic behavior (i.e. its natural or critical mode shape(s)) and data on the particular rotor's generic design and manufacture (i.e. its derived generic pattern(s) of unbalance distribution).

As used herein, "low-speed" refers to those speeds of a rotor below the first or fundamental critical speed of the rotor at which the rotor behaves substantially as a rigid body during rotation without any significant amount of flexure. At low speed, the rotor can be satisfactorily balanced in two planes. "High-speed" refers to those speeds near or above the first critical speed.

The balancing method is initiated by first specifying the number and location of balance correction planes that are required for the specific rotor. The number of planes selected (three or more) is not restricted to an even number, and is chosen on the basis of well-known criteria such as number and nature of the critical mode shapes to be encountered in operation, and complexity of the unbalance distribution to be accommodated. Then a Balancing Rule is selected. The Balancing Rule is a specification for a procedure with number J sequences of low-speed balancing and involving a number I of Balancing Factors K, where J and I are a function of the number of selected balance correction planes N as follows:

| (N) Number of Balance Planes | (J) Number of Low-Speed Balances | (I) Number of Balancing Factors K |
| --- | --- | --- |
| 3 | 2 | 1 |
| 4 | 2 | 2 |
| 5 | 3 | 3 |
| 6 | 3 | 4 |
| 7 | 4 | 5 |
| 8 | 4 | 6 |
| N | Integer[(N + 1)/2] | (N − 2) |

Described hereinbelow is a Balancing Rule for three correction planes, which is generally representative of the procedure for specifying the balance correction for the center plane of a system with an odd number of correction planes, and also a description of a Balancing Rule for four correction planes, which is generally representative of the procedure for specifying the balance corrections for any symmetrically sequenced pair of planes. The Balancing Factors K are determined by the specified, exemplary procedures.

Firstly, a mathematical description of the rotor 28, generic unbalances therein, and mode shapes thereof are determined.

Figure 2:
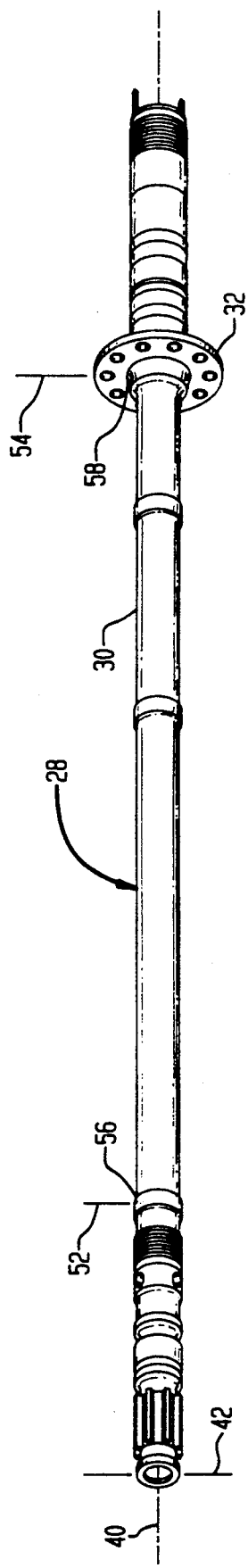
FIG. 2 is a perspective view of the rotor attached to the low-pressure turbine illustrated in FIG. 1, isolated therefrom.

More specifically, illustrated in FIG. 2 is a perspective isolated view of the rotor 28 illustrated in FIG. 1. The rotor 28 further includes a geometric longitudinal centerline 40 which is preferably aligned coincidentally with the axis of rotation 26 when the rotor 28 is installed in the engine 10.

Figure 3:
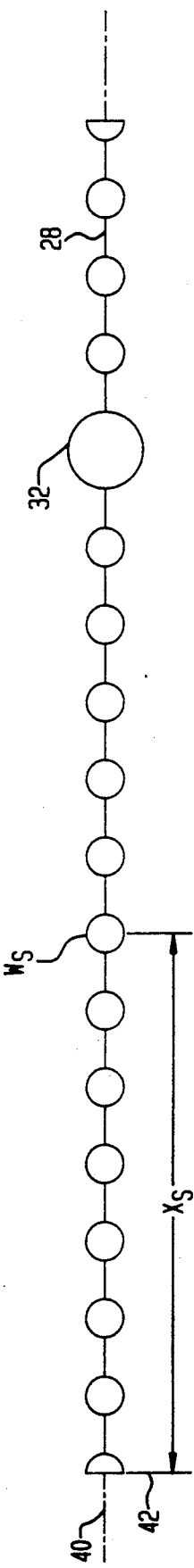
FIG. 3 is a schematic representation of the rotor shown in FIG. 2 illustrating a finite mass distribution representation of the rotor.

Illustrated in FIG. 3 is an exemplary schematic representation of the rotor 28 of FIG. 2. The rotor 28 may be represented by a finite number of discrete masses $W_s$, each located at a distance $X_s$ along the centerline 40 from a reference plane 42. Although 18 masses $W_s$ (i.e. s=1, 2, 3 . . . 18) are illustrated for drawing simplicity, any number of masses $W_s$ may be used, and in one embodiment analyzed, 50 masses were used. The location of the masses $W_s$ is selected to be coincident with prominent features of the rotor 28, such as, for example, the flange 32, bearing support locations and the balance correction planes.

Figure 4:
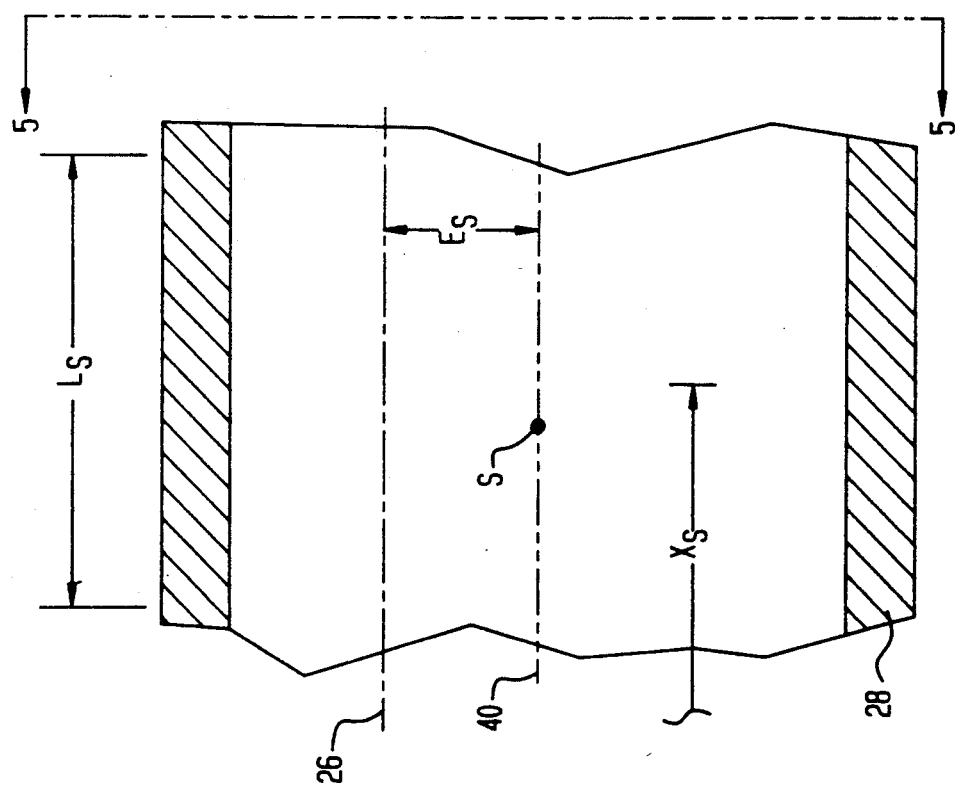
FIG. 4 is a sectional view of a portion of the rotor illustrated in FIG. 2 showing the derivation of a mass section for the distribution illustrated in FIG. 3.

Illustrated in FIG. 4 is a representative section of the rotor 28 showing a portion of a finite length $L_s$ which will be attributed to the mass station s located at the distance $X_s$ from the reference plane 42. Also referring to FIG. 5, which is a sectional end view of the rotor 28, it is readily apparent that an amount of mass $W_s$ may be attributed to the portion of the rotor 28 of length $L_s$, which is simply stated as the density of the tubular portion $L_s$ times the material volume of that portion.

Figure 5:
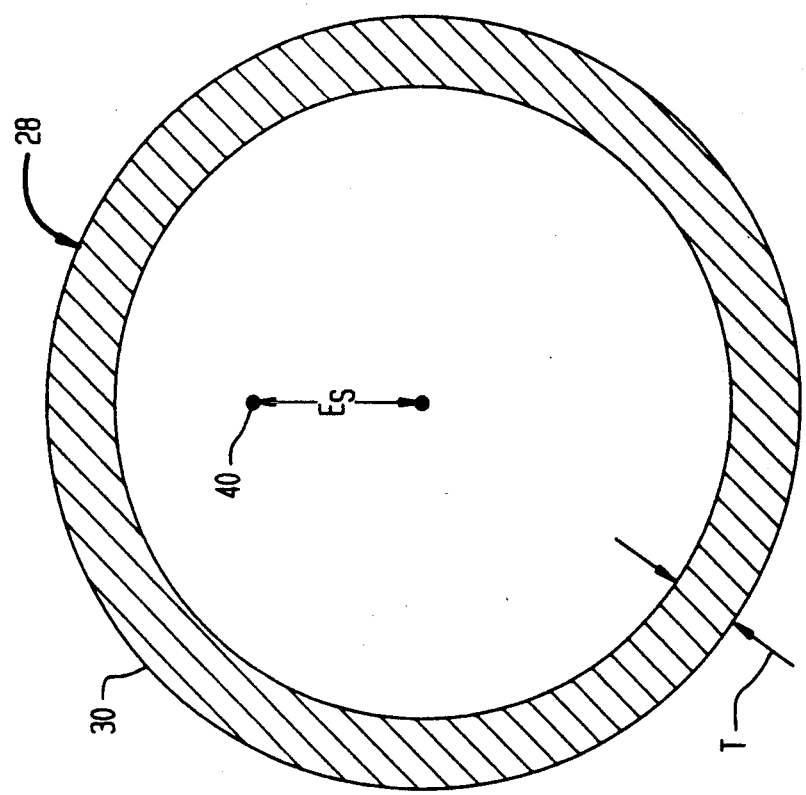
FIG. 5 is an end sectional view of the cross section of the rotor illustrated in FIG. 4 taken along lines 5—5.

Accordingly, the mathematical representation of the rotor 28 of FIG. 2 may be generated as illustrated in FIGS. 3 through 5. Since the flange 32 of the rotor 28 represents a relatively large or lump mass, it is represented schematically by a larger circle in FIG. 3.

An important feature of the present invention is the recognition of generic unbalances associated with a type or family of rotors 28. As described above, and to facilitate the required computational sequence, the rotor 28 is defined by a number S of axial locations $X_s$ along its centerline 40. An appropriate portion of the rotor's mass $W_s$ is assigned to each location, as in FIG. 3. A generic unbalance may be specified as a small eccentricity or displacement $E_s$ from the centerline of rotation 26 of each of the centers of gravity of these individual mass elements $W_s$ as illustrated in FIG. 4. For a given shaft design, manufactured by a specified procedure, the array of eccentricities generally will not be arbitrary or random. In long slender shafts such as shaft 30, it may be determined on the basis of systematic measurement that a significant contribution to unbalance is made by some built-in bend or bow in the shaft 30 which will be perceived as the unbalance distribution shown in FIG. 6.

Figure 6:
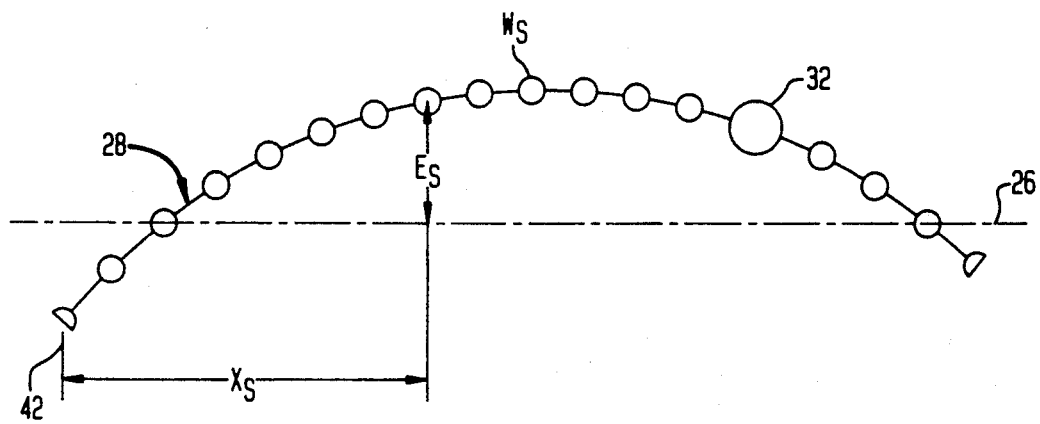
FIG. 6 is a schematic representation of a generic unbalance bow distribution of the rotor illustrated in FIGS. 2 and 3.

FIG. 6 illustrates by measurement of an actual rotor 28, or a sampling or statistical sampling of rotors 28 of one family type, a generic unbalance representing a bow or bend of the rotor 28 in a general arcuate or concave profile about the axis of rotation 26.

Figure 7:
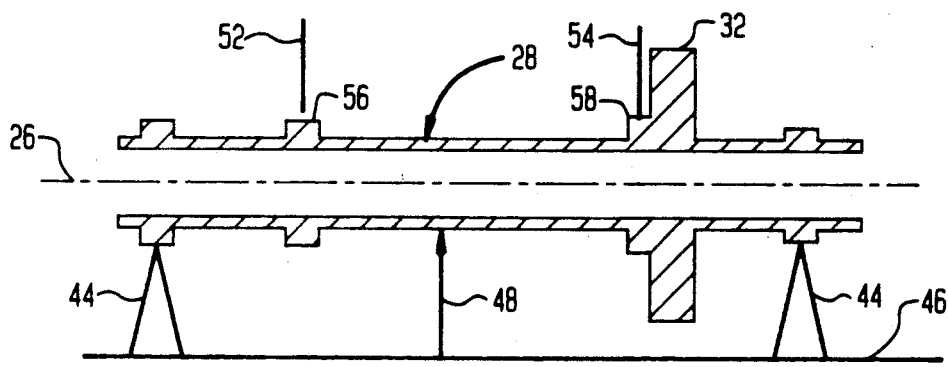
FIG. 7 is a sectional schematic view of means for measuring radial runout of the rotor illustrated in FIG. 2.

For example, and as illustrated in FIG. 7, the rotor 28 may be placed in two conventional supports 44 on a reference table 46. The rotor 28 is slowly rotated in the supports 44 and the outer diameter of the rotor 28 relative to the reference table 46 may be measured by any conventional means 48, such as a dial caliper, for example, to measure runout of the rotor 28 along its entire axial length.

Figure 8:
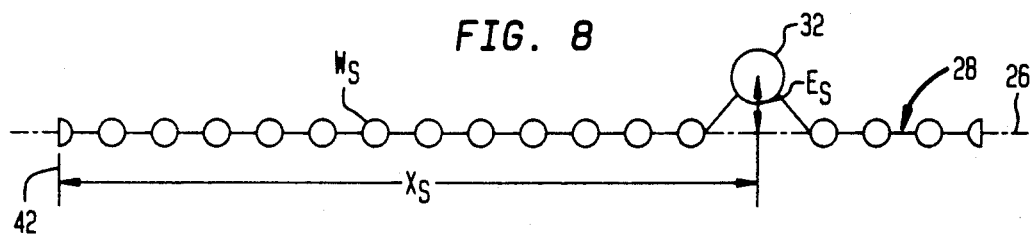
FIG. 8 is a schematic representation of a generic lump unbalance distribution of the rotor illustrated in FIGS. 2 and 3.

Referring to FIGS. 4–6, the runout of the rotor 28 can be used to represent the eccentricity $E_s$ of the center of gravity of the mass element $W_s$ relative to the axis of rotation 26. By using this procedure, the generic bow unbalance of the rotor 28 is defined as illustrated in FIG. 6.

Where a long slender shaft has a large, relatively heavy flange or disk attached, such as flange 32, the eccentricity of the center of gravity of that disk from the axis of rotation 26 may be a prime contributor to the rotor's unbalance as shown in FIG. 8.

FIG. 8 shows a second type of generic unbalance or lump unbalance, which, as illustrated, shows that the flange 32 is eccentric to the axis of rotation 26 by an amount $E_s$. All other mass units $W_s$ of the rotor 28 have centers of gravity which are coincident with the axis of rotation 26, i.e. $E_s$ equal to zero.

Figure 9:
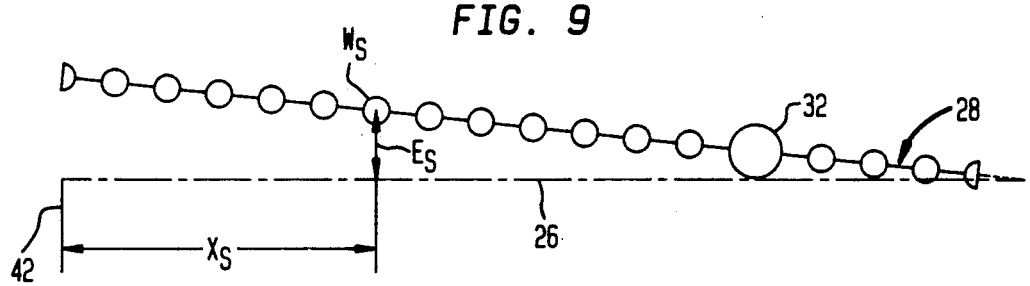
FIG. 9 is a schematic representation of a generic tilt unbalance distribution of the rotor illustrated in FIGS. 2 and 3.

If the rotor 28 is assembled to another component through a coupling which is not true, an unbalance distribution such as that shown in FIG. 9 may result. FIG. 9 illustrates the generic tilt unbalance of the rotor 28 which occurs when the rotor 28 is installed in the engine 10 such that it is tilted relative to the axis of rotation 26.

A fourth generic unbalance can be attributable to variation in thickness T around the circumference of the hollow shaft 30 as measured in the cross section as illustrated in FIG. 5.

Figure 10:
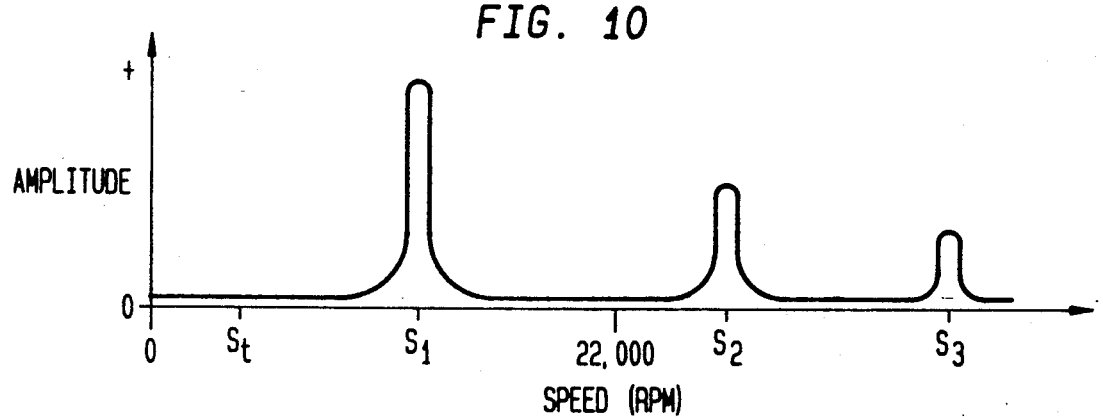
FIG. 10 illustrates a graph plotting maximum amplitude of vibration of a rotor versus rotational speed of the rotor.

A second parameter required in accordance with the invention is a mode shape of vibration associated with a critical speed at which natural resonance occurs. Illustrated in FIG. 10 is an exemplary graph plotting the maximum amplitude of vibration of the rotor 28 versus rotational speed of the rotor 28. Conventional techniques, including analysis and test, are available for determining the critical speeds, i.e. the speed at which resonance of the rotor 28 occurs and the displacement distribution, which may be normalized, which describes the rotating mode shape of rotor 28.

FIG. 10 illustrates the first three critical speeds $S_1$, $S_2$ and $S_3$ of the rotor 28 at which the first three critical or natural mode shapes, respectively, occur. It is apparent that relatively large amplitudes of vibration occur at these three critical speeds and also at slightly below and above each critical speed with the amplitude approaching zero at speeds away from the critical speeds. The rotor 28 behaves as a rigid body with generally little amplitude of vibration due to flexibility of the rotor 28 at such speeds away from the critical speeds. And the rotor 28 behaves as a flexible body at speeds at and near the critical speeds.

In the exemplary embodiment illustrated, the rotor 28 operates through the first critical speed $S_1$ of about 12,090 rpm and up to about 22,000 rpm. Since it rotates during part of its operation at supercritical speeds, the introduction of balance correction to improve supercritical balance is desirable.

The critical speeds of the rotor 28 and the mode shapes associated therewith may be conventionally determined either for the rotor 28 as illustrated in FIG. 2 removed from the engine 10, or, preferably, for the rotor 28 installed in the engine 10 as illustrated in FIG. 1. Since one object of the present invention is to reduce unbalance of the rotor 28 during operation in the engine 10, it is preferable that the critical speeds and mode shapes of the rotor 28 are most like those actually occurring in the engine 10. The accuracy of determining the critical speeds and the respective mode shapes merely affects the degree of improvement attributable to the present invention.

Figure 11:
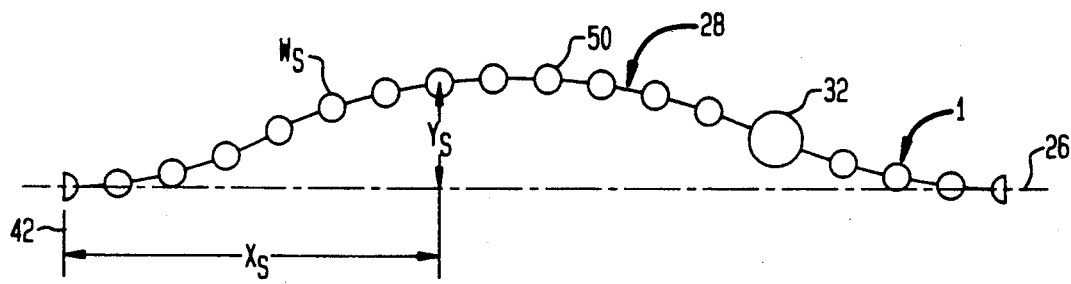
FIG. 11 is a schematic representation of a first mode shape of the rotor illustrated in FIGS. 2 and 3.
Figure 12:
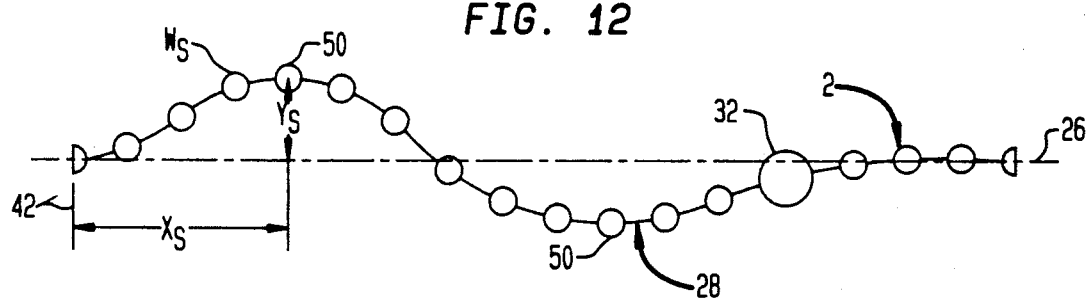
FIG. 12 is a schematic representation of a second mode shape of the rotor illustrated in FIGS. 2 and 3.
Figure 13:
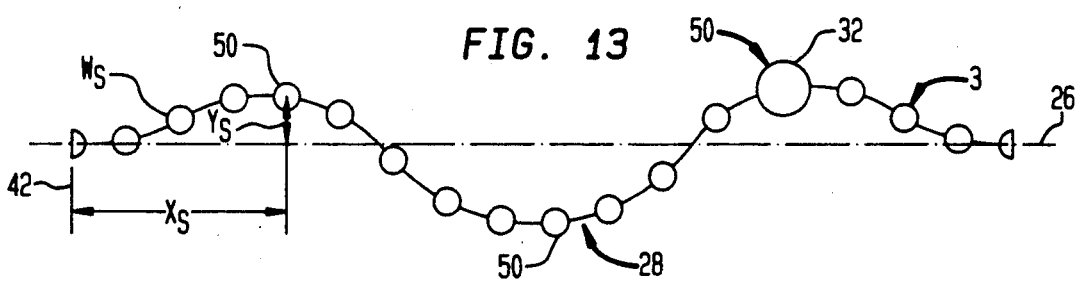
FIG. 13 is a schematic representation of a third mode shape of the rotor illustrated in FIGS. 2 and 3.

Illustrated in FIGS. 11, 12 and 13 are the three mode shapes 1, 2, 3 of the rotor 28 which occur at and near the first three critical speeds $S_1$, $S_2$, and $S_3$, respectively, as illustrated in FIG. 10. The mode shapes 1, 2 and 3 are defined by a normalized deflection $Y_s$ at each mass unit station s located at the distance $X_s$ from the reference plane 42 for each of the critical speeds $S_1$, $S_2$ and $S_3$ as illustrated in FIGS. 11-13.

The first mode shape 1 illustrated in FIG. 11 is generally in the form of half a sine wave and has a maximum amplitude occurring near the center of the rotor 28, which is conventionally defined as an antinode 50.

The second mode shape 2 illustrated in FIG. 12 is generally in the form of a full sine wave which has two antinodes 50 of opposite phase.

The third mode shape 3 illustrated in FIG. 13 is generally in the form of one-and-one-half sine waves and has three antinodes 50 with the two antinodes 50 nearest the outer ends of the rotor 28 in phase with each other and out of phase with the third antinode 50 disposed near the center of the rotor 28.

As described above, conventional low-speed balancing utilizes two spaced correction planes, i.e. a first correction plane 52 and a second correction plane 54 as illustrated in the exemplary rotor 28 shown in FIGS. 2 and 7. The rotor 28 also includes two annular correction lands, i.e. a first correction land 56 and a second correction land 58, also illustrated in FIGS. 2 and 7. The correction planes 52 and 54 are disposed through the center of the correction lands 56 and 58, respectively.

Also as described above, in order to introduce into the low-speed balancing method of the present invention a correction for high-speed unbalance of the rotor 28, additional correction planes are required with each being associated with a predetermined combination of a generic unbalance distribution and a mode shape. For example, for three-plane balancing a single pair of the predetermined combination of generic unbalance distribution and mode shape is utilized and for four-plane balancing two pairs are utilized.

It is apparent that many combinations of generic unbalance and mode shapes are possible from those illustrated in FIGS. 6, 8, 9 and 11-13. For an exemplary embodiment of the invention utilizing the rotor 28 illustrated in FIG. 1, a first combination of generic unbalance distribution and mode shape is illustrated as the combination of the bow unbalance of FIG. 6 and the first mode shape of FIG. 11. A second combination of generic unbalance distribution and mode shape is illustrated as the combination of the lump unbalance of FIG. 8 and the first mode shape of FIG. 11.

Since the shaft 30 of the rotor 28 is relatively long and slender, the generic bow unbalance distribution as illustrated in FIG. 6 is typically present. Since the rotor 28 also includes a relatively heavy flange 32, which is subject to being machined eccentric from the axis of rotation 26, the generic lump unbalance distribution illustrated in FIG. 7 is also typical for this type of rotor 28.

Furthermore, the rotor 28 of the engine 10 illustrated in FIG. 1 operates at speeds up to about 22,000 rpm, which is well above the first flexural critical speed $S_1$ of about 12,070 rpm as illustrated in FIG. 10 and well below the second flexural critical speed $S_2$. Therefore, only the first mode shape 1, as illustrated in FIG. 11, is an influencing factor. However, for other rotors operating near the second critical speed $S_2$ of FIG. 10, various combinations of the generic unbalance distribution and mode shapes, including the second mode shape 2 as illustrated in FIG. 12, could be used to reduce unbalance at operation of the rotor near the second critical speed $S_2$.

Figure 17A:
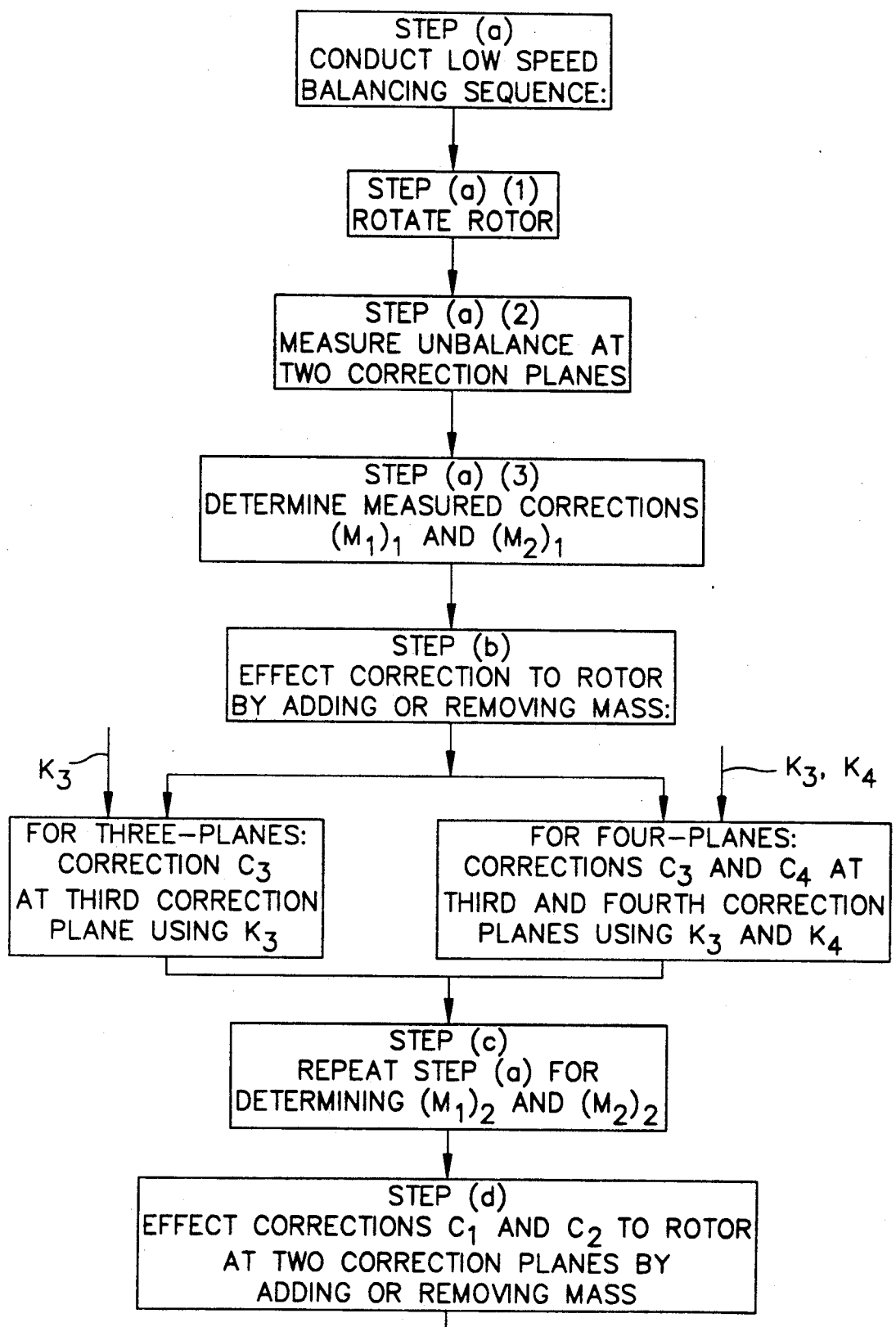
FIG. 17A is a flowchart illustrating a method of balancing a rotor in accordance with one embodiment of the present invention.

In accordance with a preferred and exemplary embodiment of the present invention, the low-speed method of balancing the rotor 28 having the axis of rotation 26 includes, as shown in FIG. 17A, a low-speed balancing sequence step (a) including (1) firstly rotating the rotor 28 about the axis of rotation 26 at a low test speed $S_t$, which is less than the first critical speed $S_1$ associated with the first natural resonance or mode shape 1 of the rotor 28 as illustrated in FIG. 10.

This first step may be accomplished on any conventional low-speed balancing machine 60 such as, for example, a Gisholt balancer, manufactured by the Gilman Engineering and Manufacturing Company of Jamesville, Wis., a unit of AMCA, International. The low-speed balancer 60 is illustrated schematically in FIG. 14 and includes two shaft-mounting supports 62 on which the rotor 28 is rotationally supported, such that the rotor 28 rotates about a centerline in the balancer 60, which is preferably the same as the axis of rotation 26 of the engine 10. Two annular running lands 64 are preferably provided on the rotor 28 for mounting to the mounting supports 62 of the balancer 60. The location of the running lands 64 may be provided on the rotor 28 wherever convenient or practical, provided that the rotor 28 is supported to run about the axis of rotation 26. The flexible mounting supports 62 are conventionally connected to means 66 for measuring unbalance of the rotor 28 at the first and second correction planes 52 and 54. Conventional means 68 are connected to the rotor 28 for rotating the rotor 28 to the test speed $S_t$, which is about 1800 to 2200 rpm. Any value of the test speed $S_t$ may be used and is considered "low speed" provided the rotor 28 rotates as a conventional rigid body below the speeds at which flexure of the rotor 28 due to resonance thereof renders the balance unacceptable.

The balancer 60 further includes conventional means 70 for determining first and second measured corrections $M_1$ and $M_2$ applicable to the rotor 28 at the first and second correction planes 52 and 54, respectively, for balancing any unbalance of the rotor 28 measured by the means 66. The measured corrections $M_1$ and $M_2$ are vectors having magnitudes expressed in length-mass disposed at a relative angular position.

The measuring means 66 further include means to provide a reference angular position of the rotor 28 so that the determining means 70 can provide left and right corrections represented as a mass-radius at a particular angular position for indicating required first and second corrections $C_1$ and $C_2$ which should be applied to the rotor 28 at the first and second correction planes 52 and 54, respectively, to balance the rotor 28. In the conventional low-speed balancing method, the corrections $C_1$ and $C_2$ would simply be equal to the measured corrections $M_1$ and $M_2$ as indicated by the determining means 70.

The low-speed balancing sequence of the present invention further includes (2) measuring unbalance at the first and second correction planes 52 and 54 of the rotor 28 rotating at the test speed $S_t$ and then (3) determining first values of the first and second measured corrections represented as $(M_1)_1$ and $(M_2)_1$ applicable to the rotor 28 at the first and second correction planes 52 and 54, respectively, for balancing the measured unbalance of the rotating rotor 28. The parenthetical subscript 1 is used with the measured corrections $M_1$ and $M_2$ to indicate that they are the first values thereof. A parenthetical subscript of 2 indicates a second value. Similarly, the use of parenthetical subscripts hereinbelow indicates the respective value of repeated parameters.

Figure 14:
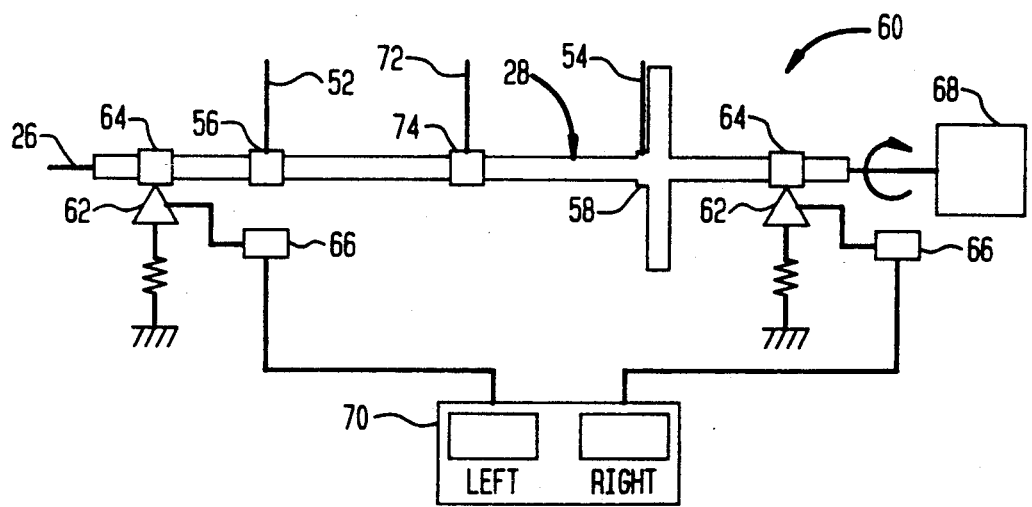
FIG. 14 is a schematic representation of a low-speed balancing machine.

The balancing method further includes the use of a third correction plane 72 as illustrated in FIG. 14. An annular third correction land 74 is provided on the rotor 28. The third correction plane 72 is disposed at the center of the third correction land 74. The location of the third correction plane 72 and land 74 is spaced from the first and second correction lands 56 and 58 and is preferably disposed as further discussed hereinbelow.

The balancing method of the present invention further includes the step (b) of effecting at the third correction plane 72 a third correction $C_3$ to the rotor 28, which is a predetermined proportion of at least one of the first values of the first and second measured corrections $(M_1)_1$ and $(M_2)_1$, the proportion being predetermined to correct for a predetermined unbalance of the rotor 28 for a predetermined mode shape of the rotor 28 associated with a speed of the rotor 28 greater than the test speed $S_t$ without actually rotating the rotor 28 to the greater speed to measure unbalance. In one embodiment, the greater speed is the first critical speed $S_1$.

The balancing method of the invention further includes the step (c) of repeating the low-speed balancing sequence (a) described above for the rotor 28 having the third correction $C_3$ made to the rotor 28 to determine second values of the first and second measured corrections $(M_1)_2$ and $(M_2)_2$ at the first and second correction planes 52 and 54.

The balancing method of the invention also includes the step (d) of effecting the second values of the first and second measured corrections $(M_1)_2$ and $(M_2)_2$ to the rotor 28 at the first and second correction planes 52 and 54 as first and second corrections $C_1$ and $C_2$, respectively.

The first, second and third corrections $C_1$, $C_2$ and $C_3$ can be effected by either adding mass to the rotor 28 at the first, second and third correction lands, respectively, or removing mass therefrom. In either case, the low-speed balancer 60 and the method of the invention are appropriately set up to either add or remove mass.

The step (b) of effecting the third correction $C_3$ at the third correction plane 72 utilizes a predetermined Balancing Rule, which is determined by the number of additional balancing planes greater than two which are desired for accommodating combinations of generic unbalance and mode shape. For example, described hereinbelow are exemplary Balancing Rules for three- and four-plane balance.

Balancing Rule for Three-Plane Balance

Figure 15:
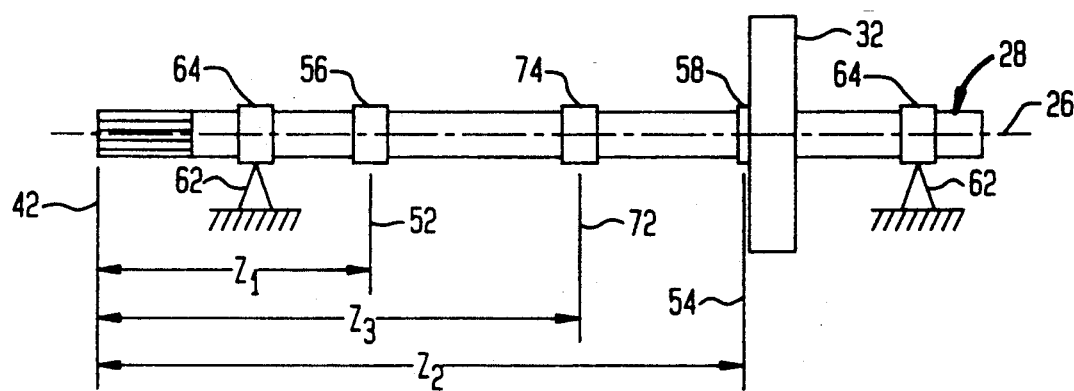
FIG. 15 is a schematic representation of the rotor illustrated in FIG. 2 illustrating three correction planes for three-plane balancing.

Illustrated in FIG. 15 is a typical high-speed rotor such as the rotor 28, having only three-plane balance correction. The baseline outboard first and second correction planes 52 and 54 and the third added correction plane 72 each have their unique axial location $Z_n$, where $n=1$, 2 or 3. The locations $Z_n$ are preferably coincident with respective ones of the locations $X_s$ of the masses $W_s$. The Balancing Rule from which the correction $C_3$ in the third correction plane 72 is specified is represented by the vector addition equation as follows:

$$C_3 = K_3 (f_1(M_1)_1 + f_2(M_2)_1)$$

where
$(M_1)_1$ and $(M_2)_1$ are the first values of vector measured corrections $M_1$ and $M_2$ as described above in the first low-speed balancing sequence (a) in the first and second correction planes 52 and 54; and
$f_1$ and $f_2$ are factors selected beforehand to reflect the influence of the relative location of the third correction plane 72. If the plane 72 is equidistant from the outboard planes 52 and 54, $f_1$ and $f_2$ may, typically, both be taken as 1.0. If the plane 72 is closer to the left plane 52, then $f_2$ may, typically, be taken as a number less than 1.0 and even zero and $f_1$ may be 1.0. If the plane 72 is closer to the right plane 54, then $f_1$ may, typically, be taken as a number less than one and even zero and $f_2$ may be 1.0. The selection of $f_1$ and $f_2$ is not critical to the effectiveness or accuracy of the procedure, but can be refined by trial-and-error to minimize the total absolute amount of unbalance that might be required for a given shaft in normal circumstances. Since the rotor 28 includes the relatively heavy flange 32, the third correction plane 72 is preferably disposed nearer to the flange 32 and the second correction plane 54 than to the first correction plane 52; and
$K_3$ is a constant balancing factor developed by application of the three-plane dynamic response simulation method described below; and
$C_3$ is a vector balance correction applied at the third correction plane 72.

The balancing method of the present invention in one of its simplest forms includes the following balancing rule for three-plane balancing:

$$C_3 = K_3 (M_1)_1 + K_3 (M_2)_1.$$

This portion of the Balancing Rule is also pertinent to the mid-plane of any system whose total number of correction planes is odd.

A second application of the low-speed balancing sequence (a) as described above is used to determine the final balance correction in the outboard first and second correction planes 52 and 54 as represented by:

$$C_1 = (M_1)_2$$

$$C_2 = (M_2)_2$$

where
- $(M_1)_2$ and $(M_2)_2$ are the second values of vector measured corrections $M_1$ and $M_2$ from the second low-speed balance sequence for correction planes 52 and 54; and
- $C_1$ and $C_2$ are the vector balance corrections applied to planes 52 and 54, respectively.

Figure 17B:
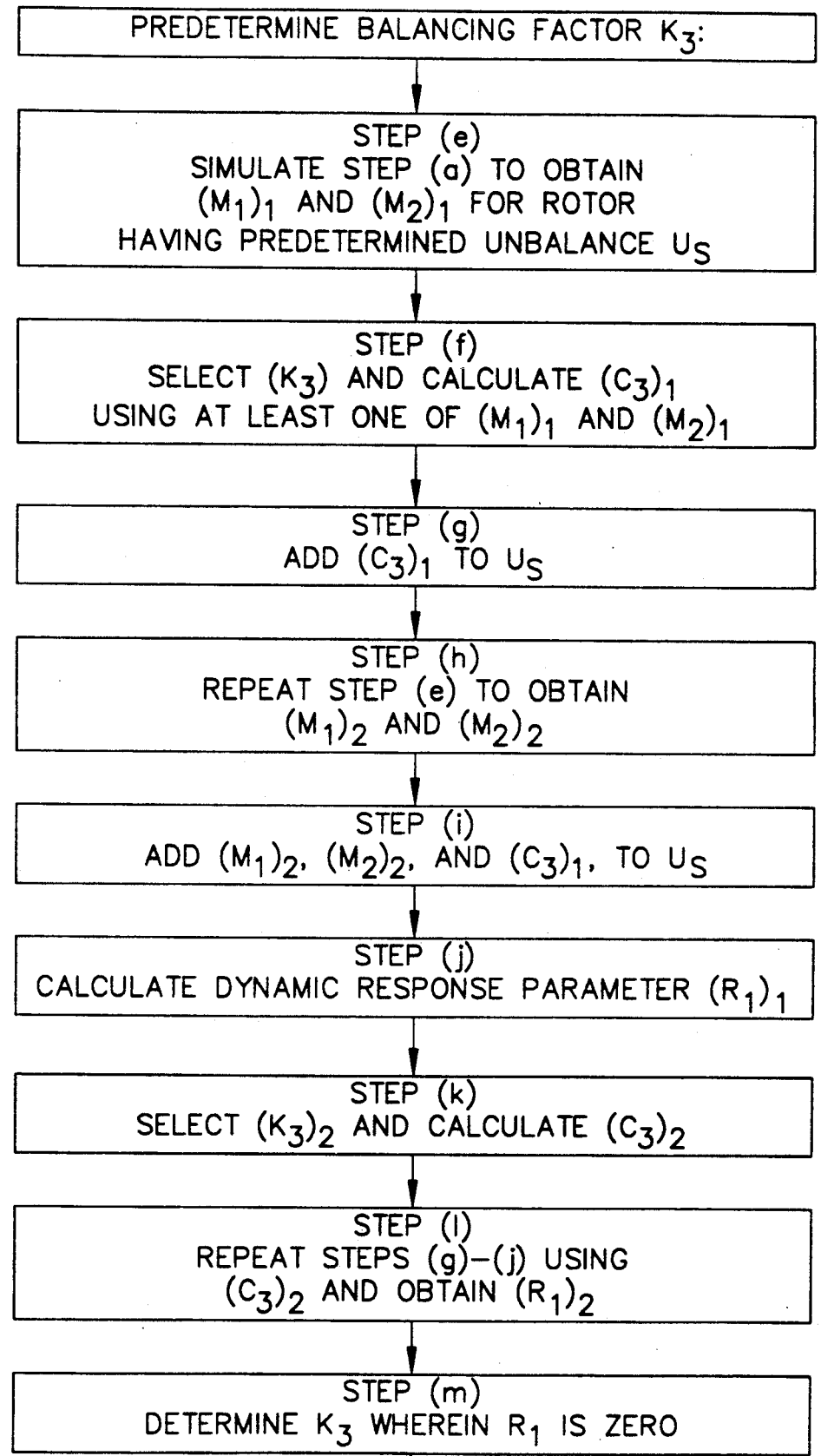
FIG. 17B is a flowchart illustrating method steps for obtaining a predetermined Balancing Factor $K_3$ used in the method illustrated in FIG. 17A for three-plane balancing.

The Dynamic Response Simulation Method for Predetermining the Balancing Factor $K_3$ for Three-Plane Balancing A dynamic response simulation method for determining the value of the Balancing Factor is illustrated first by demonstration of computation of $K_3$ for the simplest case of three-plane balancing as shown in FIG. 17B.

A rotor is mathematically defined as having a predetermined generic unbalance distribution giving, at each station s, an unbalance $U_s$ represented as:

$U_s = W_s E_s$ where $s = 1, 2, 3 \ldots S$, S being the total number of mass stations.

The sequence of low-speed balancing may now be done in analytical simulation, or in a simulating step (e). Preferably, the first analytical low-speed balancing simulation is computed using the relationships

- $F = \Sigma U_s$, where F is the total force unbalance represented by the sum of $U_s$ for $s = 1, 2, 3 \ldots S$;
- $T = \Sigma U_s X_s$, where T is the total moment unbalance represented by the sum of the product $U_s X_s$ for $s = 1, 2, 3 \ldots S$;
- $Z_r = T/F$, where $Z_r$ is the resultant location of the total unbalance measured relative to the reference plane 42;
- $M_1 = -F(Z_2 - Z_r)/(Z_2 - Z_1)$, where $M_1$ is the simulated measured correction required in the first correction plane 52; and
- $M_2 = -F(Z_1 - Z_r)/(Z_1 - Z_2)$, where $M_2$ is the simulated measured correction required in the second correction plane 54.

The balance correction $C_3$ is determined from the selected Balancing Rule (for example the one specified above wherein $f_1$ and $f_2$ are preselected to have values of 1.0) using a guessed Balancing Factor $K_3$ in a step (f). The correction $C_3$ is then analytically added to the unbalance distribution $U_s$ by modifying $U_s$ at the location corresponding to the third correction plane 72 in a step (g).

The second (and, in this case, the final) analytical low-speed balancing simulation step (e) is then repeated in a step (h) for the modified distribution $U_s$. This provides second values of the first and second balance corrections $(M_1)_2$ and $(M_2)_2$, which can then be analytically added to the modified distribution $U_s$, by again modifying $U_s$ at the locations corresponding to the correction planes 52 and 54 in a step (i).

The analytically simulated "balanced" rotor 28 thus has an unbalance distribution of:

- $B_s = (U_s + C_n)$, where $B_s$ is the analytically balanced rotor distribution for $s = 1, 2, 3 \ldots S$ and $C_n$ is the applied n balance corrections (e.g. $n = 1, 2, 3$) and, for this example, includes $C_1$, $C_2$ and $C_3$, which are added to $U_s$ at the respective stations $X_s$.

The simulated rotor 28 is next analytically evaluated at a specified critical speed by using a dynamic response simulation for computing a first value of a first dynamic response parameter $R_1$ in a step (j) as follows:

- $(R_1)_1 = \Sigma B_s Y_s$, where $s = 1, 2, 3 \ldots S$, and $Y_s$ is the above-identified mode shape deflection distribution at the specified critical speed which may be normalized or may have absolute values instead.

This response parameter is proportional to the vibratory response of the rotor 28 at the critical speed, $S_1$, for this example, as represented by the mode shape 1 of FIG. 11.

A new, second value of the Balancing Factor $(K_3)_2$ is selected in a step (k) which differs from the original guess by $$\Delta K_3 = (K_3)_2 - (K_3)_1$$

and a second value of the third, correction $(C_3)_2$ is calculated using the Balancing Rule and $(K_3)_2$.

The method further includes a step (l) for repeating steps (g)–(j) using $(C_3)_2$ instead of $(C_3)_1$ to obtain a new, second value of the calculated dynamic response parameter $(R_1)_2$ at the critical speed $S_1$ which differs from the original calculation by $$\Delta R_1 = (R_1)_2 - (R_1)_1.$$

The conventional and classical Newton-Raphson formula is then used in a step (m) to determine the third and final value of the Balancing Factor $(K_3)_3$, which results in a zero value of the first dynamic response parameter $R_1$. Setting the required response $(R_1)_3$ to zero results in:

$$(R_1)_3 = 0 = (R_1)_1 + [(K_3)_3 - (K_3)_1](\Delta R_1/\Delta K_3)$$

which may be solved for the required value of the Balancing Factor as follows:

$$(K_3)_3 = (K_3)_1 - (R_1)_1/(\Delta R_1/\Delta K_3).$$

The entire procedure can be summarized in tabular form as follows:

| Balancing Factor | Calculated Dynamic Response Parameter |
| --- | --- |
| $(K_3)_1$ | $(R_1)_1$ |
| $(K_3)_2 = (K_3)_1 + \Delta K_3$ | $(R_1)_2 = (R_1)_1 + \Delta R_1$ |
| $(K_3)_3$ | 0 |

This exemplary three-plane balancing has introduced into the third correction $C_3$ the influence of a generic unbalance, e.g. the bow unbalance of FIG. 6, and a mode shape, e.g. the first mode shape of FIG. 11.

The balancing method as above described for use by an operator using a low-speed balancing machine firstly includes the low-speed balancing sequence (step (a)) for obtaining the first values of the measured corrections $(M_1)_1$ and $(M_2)_1$ for the rotor 28, which are readily read from the determining means 70 of the low-speed balancer 60 illustrated in FIG. 14 by the operator thereof. The operator then effects the correction $C_3$, determined from the Balancing Rule (step (b)), to the third correction land 74 at the third correction plane 72. This can be accomplished by simply removing by conventional milling a predetermined amount of material at the angular position determined in the determining means 70, or by the addition of an appropriate mass 180 degrees from the designated angular position. Depending upon the type of low-speed balancer 60 utilized, the angular position can indicate the position for either removing or adding material.

The operator then simply repeats (step (c)) the low-speed balancing sequence on the corrected rotor 28 and reads from the determining means 70 the second values of the measured first and second corrections $(M_1)_2$ and $(M_2)_2$. The operator then simply makes corrections $C_1$ and $C_2$ (step (d)), which are equal to the second values of the measured corrections $(M_1)_2$ and $(M_2)_2$, respectively, by either the removal or addition of mass, as appropriate, from or to the first and second correction lands 56 and 58 at the first and second correction planes 52 and 54, respectively. The rotor 28 has then been balanced in the low-speed balance machine 60 by a method which introduces correction $(C_3)$ for reducing the predetermined unbalance at the high speed associated with the predetermined critical speed and mode shape, e.g. the bow unbalance and the first mode shape.

Accordingly, any combination of generic unbalance and mode shape can be utilized for three-plane balancing such as those represented in FIGS. 6, 8, 9 and 11–13.

Balancing Rule for Four-Plane Balance

Figure 16:
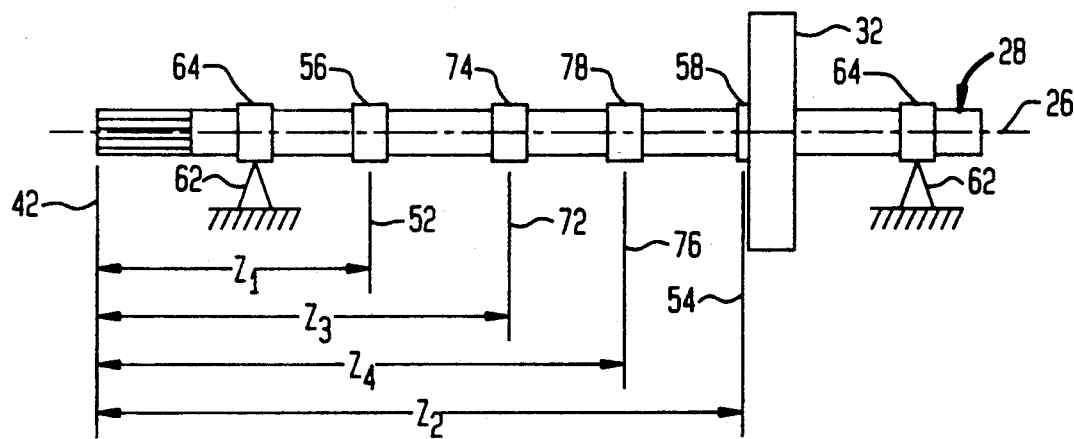
FIG. 16 is a schematic representation of the rotor illustrated in FIG. 2 showing four correction planes for four-plane balancing.

Illustrated in FIG. 16 is a typical high-speed rotor, such as the rotor 28, having four-plane balance correction. The rotor 28 includes (generally outboard) first and second correction planes 52 and 54 and the third correction plane 72. The rotor 28 also includes a fourth correction plane 76 disposed through the center of an annular fourth correction land 78. Each of the correction planes 52, 54, 72 and 76 has a unique axial location $Z_n$, where n=1, 2, 3 or 4. Following the first low-speed balancing sequence (step (a)), either of two alternative Balancing Rules to specify the correction in planes 72 and 76 and their associated correction lands 74 and 78 may be used (step (b)). The first is based on an unbalance measurement at the outboard planes 52 and 54 as follows:

$$C_3 = K_3 (M_1)_1$$

$$C_4 = K_4 (M_2)_1$$

where $(M_1)_1$ and $(M_2)_1$ are the first values of vector measured corrections $M_1$ and $M_2$ in the first low-speed balancing sequence in planes 52 and 54;

$K_3$ and $K_4$ are constant Balancing Factors developed by the application of the four-plane dynamic response method described below;

$C_3$ and $C_4$ are the vector balance corrections applied to the third and fourth correction planes 72 and 76, respectively.

Alternatively, the corrections might be based on unbalance measurements at the planes in which the correction is to be made.

$$C_3 = K_3 (M_3)_1$$

$$C_4 = K_4 (M_4)_1$$

where $(M_3)_1$ and $(M_4)_1$ are the first values of vector measured corrections $M_3$ and $M_4$ in the first low-speed balance sequence in planes 72 and 76;

$K_3$ and $K_4$ are constant Balancing Factors developed by the application of the four-plane dynamic response simulation method described below; and $C_3$ and $C_4$ are the vector balance corrections applied to the third and fourth correction planes 72 and 76, respectively.

These balancing rules are also applicable to pairs of added planes for any larger total number of correction planes. Other Balancing Rules based on various combinations of $M_1$, $M_2$, $M_3$ and/or $M_4$ may be also used.

As in the three-plane Balancing Rule, the second low-speed balancing sequence (step (c)) is used to make the final balance correction in the outboard planes 52 and 54:

$$C_1 = (M_1)_2$$

$$C_2 = (M_2)_2$$

where $(M_1)_2$ and $(M_2)_2$ are the second values of vector measured corrections $M_1$ and $M_2$ in the second low-speed balance sequence in planes 52 and 54; and $C_1$ and $C_2$ are the vector balance corrections applied to planes 52 and 54, respectively (step (d)).

Figure 17C:
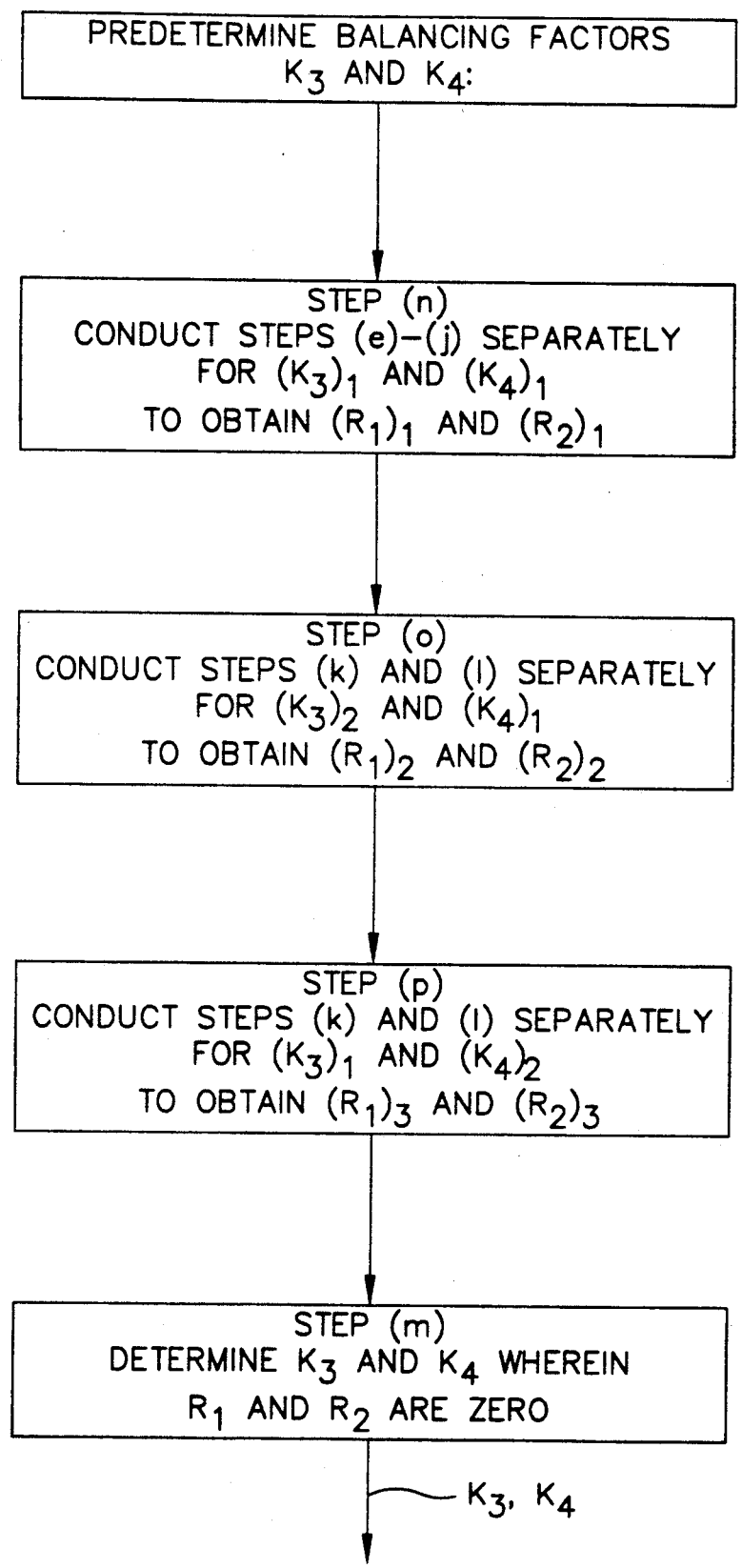
FIG. 17C is a flowchart illustrating method steps for obtaining predetermined Balancing Factors $K_3$ and $K_4$ used in the method illustrated in FIG. 17A for four-plane balancing.

The Dynamic Response Simulation Method for Predetermining Balancing Factors $K_3$ and $K_4$ for Four-Plane Balancing In a manner analogous to that outlined above for three-plane balancing, four-plane balancing is accomplished, as shown in FIG. 17C, by first selecting by guessing first values of the two Balancing Factors $(K_3)_1$ and $(K_4)_1$. Then, using these values of the Balancing Factors and the selected Balancing Rule, an analytical low-speed balancing sequence and critical dynamic response computation (steps (e)–(j)) are performed, separately, twice, once for each selected pair or combination of generic unbalance distribution and critical mode shape in a step (n). The first pair of generic unbalance distribution and critical mode shape yields a first value of a first dynamic response parameter $(R_1)_1$. The second pair of generic unbalance distribution and critical mode shape yields a first value of a second dynamic response parameter $(R_2)_1$.

The procedure in steps (k) and (l) for low-speed balancing and dynamic response simulation is then repeated a second time in a step (o) using a modified second, guessed, value of $(K_3)_2$, while holding the value of $K_4$ the same as in the first sequence $(K_4)_1$ for the first and second combinations. This permits the calculation of new, second values of dynamic response parameters $(R_1)_2$ and $(R_2)_2$ which can be used to establish a partial derivative or influence coefficient for the effect of any variation in $K_3$.

The procedure in steps (k) and (l) is then again repeated a third time in a step (p) using a modified, second, guessed, value of $(K_4)_2$, represented alternatively as $(K_4)_3$ for this third sequence, while restoring the value of $(K_3)_3$ to the same as in the first sequence $(K_3)_1$. This permits the calculation of new, third values of dynamic response parameters $(R_1)_3$ and $(R_2)_3$ which can be used to establish a partial derivative or influence coefficient for the effect of any variation in $K_4$.

The set of four derived influence coefficients, i.e. the three values each of $K_3$, $K_4$, $R_1$ and $R_2$, can then be used in the Newton-Raphson formulation to calculate precisely the final values of Balancing Factors $(K_3)_4$ and $(K_4)_4$ which will result in both dynamic response parameters $(R_1)_4$ and $(R_2)_4$ being driven to zero. The entire sequence can be summarized in tabular form as follows:

| Balancing Factors | Calculated Response Parameters |
|---|---|
| $(K_3)_1$ | $(R_1)_1$ |
| $(K_4)_1$ | $(R_2)_1$ |
| $(K_3)_2 = (K_3)_1 + \Delta K_3$ | $(R_1)_2 = (R_1)_1 + (\Delta R_1)_2$ |
| $(K_4)_2 = (K_4)_1$ | $(R_2)_2 = (R_2)_1 + (\Delta R_2)_2$ |
| $(K_3)_3 = (K_3)_1$ | $(R_1)_3 = (R_1)_1 + (\Delta R_1)_3$ |
| $(K_4)_3 = (K_4)_1 + \Delta K_4$ | $(R_2)_3 = (R_2)_1 + (\Delta R_2)_3$ |
| $(K_3)_4$ | $(R_1)_4 = 0$ |
| $(K_4)_4$ | $(R_2)_4 = 0$ |

In this case, the Newton-Raphson formulation for closure of the calculation involves the solution of the following two simultaneous equations for $(K_3)_4$ and $(K_4)_4$:

$$(R_1)_4 = 0 = (R_1)_1 + [(K_3)_4 - (K_3)_1][(\Delta R_1)_2/\Delta K_3)] + [(K_4)_4 - (K_4)_1][(\Delta R_1)_3/\Delta K_4)]$$

$$(R_2)_4 = 0 = (R_2)_1 + [(K_3)_4 - (K_3)_1][(\Delta R_2)_2)_2/\Delta K_3)] + [(K_4)_4 - (K_4)_1][(\Delta R_2)_3/\Delta K_4)]$$

By analogy, the entire procedure may be extended to five-plane or six-plane or virtually any number of balance correction planes for simulated or pseudo-high-speed balancing.

As is apparent from the above description, the four-plane balancing method is an extension of the three-plane balancing method described above.

More specifically, the step (b) for effecting the third correction to the rotor 28 as described for the three-plane balancing method further includes effecting at the third correction plane 72 the third correction $C_3$ to the rotor 28 and at the fourth correction plane 76 a fourth correction $C_4$ to the rotor 28. The third and fourth corrections $C_3$ and $C_4$ are predetermined proportions of at least one of the first and second measured corrections $M_1$ and $M_2$ and include the Balancing Factor $K_3$ and the Balancing Factor $K_4$. The proportions are predetermined to correct for two combinations of predetermined unbalance of the rotor 28 and predetermined mode shape of the rotor 28 associated with a speed of the rotor 28 greater than the test speed $S_t$ without actually rotating the rotor 28 to the greater speed to measure unbalance.

The method further includes the step (n) for conducting separately for the Balancing Factor $K_3$ and for the Balancing Factor $K_4$, instead of the Balancing Factor $K_3$, the steps (e) through (j), each using different ones of the two combinations of predetermined unbalance and mode shape for obtaining first values of the first and second dynamic response parameters $(R_1)_1$ and $(R_2)_1$ for the first values of the Balancing Factors $(K_3)_1$ and $(K_4)_1$.

As illustrated in FIG. 16, the rotor 28 used in the exemplary engine 10 has its third correction plane 72 disposed nearer to the first correction plane 52 than to the second correction plane 54, and the fourth correction plane 76 is disposed nearer to the second correction plane 54 than to the first correction plane 52. The third and fourth corrections $C_3$ and $C_4$ are related to the first and second measured corrections in two Balancing Rules as follows:

$$C_3 = K_3 M_1$$

and $$C_4 = K_4 M_2.$$

Furthermore, in a preferred embodiment, the first combination of the predetermined unbalance and the mode shape is the bow unbalance illustrated in FIG. 6 and the first mode shape illustrated in FIG. 11, and the second combination is the lump unbalance illustrated in FIG. 8 and the first mode shape illustrated in FIG. 11.

Accordingly, the second and fourth correction lands 58 and 78 are disposed at one end of the rotor 28 near the flange 32, and the first and third correction lands 56 and 74 are disposed at an opposite end of the rotor 28.

In a preferred embodiment of the invention, the first, second, third and fourth corrections for the embodiment of the invention illustrated in FIG. 15 are made by removing material by conventional means such as milling, for example, from the first, second, third and fourth correction lands 56, 58, 74 and 78, respectively, and the Balancing Factor $K_3$ is within a range of about 95% to 105% and the Balancing Factor $K_4$ is within a range of about 95% to 105% for the third and fourth corrections $C_3$ and $C_4$ equal to $K_3 M_1$ and $K_4 M_2$, respectively. The Balancing Factors $K_3$ and $K_4$ preferably have values of about 1.0 for the exemplary embodiment.

In this preferred embodiment, it is noted that the third and fourth correction lands 74 and 78 are disposed between the first and second correction lands 56 and 58 and therefore are more effective for introducing balancing corrections for accommodating the first mode shape having the antinode 50 near its center.

In both the three- and four-plane balancing methods described above, the generic unbalance distributions are generally planar. However, the method in accordance with the present invention can be extended to generic unbalance distributions which are not planar by resolving each unbalance vector at each station s associated with a respective mass $W_s$ into orthogonal components in two planes and then applying the above methods separately to the components in each orthogonal plane. The resulting corrections in each orthogonal plane can then be vectorially added for the desired resultant corrections $C_3$ and $C_4$.

Accordingly, it will be appreciated that the method of balancing the rotor 28 in accordance with the invention results in an improved rotor having additional planes of correction for reducing unbalance due to operation of the rotor at or near critical speeds without actually balancing the rotor at such critical speeds. Of course, the method is an approximation of the actual unbalance occurring at such critical speeds; however, varying degrees of improvement in balancing are realizable depending upon the number of corrections desired and the accuracy with which the generic unbalance distribution and critical mode shapes is determined.

The invention also includes the rotors 28 balanced by the new and improved method disclosed herein. For example, a new and improved rotor in accordance with one embodiment of the present invention comprises the shaft 30 having first, second and third spaced correction lands 56, 58 and 74, which are associated with the first, second and third correction planes 52, 54 and 72, respectively. The first, second and third correction lands 56, 58 and 74 are sized and configured for effecting first, second and third corrections $C_1$, $C_2$ and $C_3$ to rotor 28 for balancing the rotor at or near a critical speed such as, for example, the first critical speed $S_1$. The lands 56, 58 and 74 may be sized and configured as annular lands having the corrections effected by removing by milling a portion of the lands or, alternatively, by adding, by suitable means, such as adding washers under bolt heads of bolted flanges, correction masses at suitable angular positions.

In the rotor 28, the third correction $C_3$ is proportional to a first combination of a predetermined unbalance of the rotor 28 and a predetermined mode shape of the rotor 28. The first and second corrections $C_1$ and $C_2$ are proportional to unbalance of the rotor 28 and the third correction $C_3$.

Also in the rotor 28, the first combination can include the predetermined bow unbalance illustrated in FIG. 6 and the first mode shape illustrated in FIG. 11, and the second combination can include the lump unbalance, illustrated in FIG. 8, and the first mode shape illustrated in FIG. 11.

While there have been described herein what are considered to be preferred embodiments of the present invention, other modifications of the invention shall be apparent to those skilled in the art from the teachings herein, and it is, therefore, desired to secure in the appended claims all such modifications as fall within the true spirit and scope of the invention.

Accordingly, what is desired to be secured by Letters Patent of the United States is the invention as recited in the following claims:

1. A method of balancing a rotor having an axis of rotation comprising:
   (a) conducting a low-speed balancing sequence including:
      (1) rotating said rotor about said axis of rotation at a test speed less than a critical speed associated with a natural resonance of said rotor;
      (2) measuring unbalance at first and second correction planes of said rotating rotor; and
      (3) determining first and second measured corrections applicable to said rotor at said first and second correction planes, respectively, for balancing said measured unbalance of said rotating rotor;
   (b) effecting at a third correction plane a third correction to said rotor which is determined from a Balancing Rule and is a predetermined proportion of at least one of said first and second measured corrections, said proportion being predetermined to correct for a predetermined unbalance of said rotor for a predetermined mode shape of said rotor associated with a speed of said rotor greater than said test speed without actually rotating said rotor to said greater speed to measure unbalance;
   (c) repeating said low-speed balancing sequence step (a) for said rotor having said third correction to determine second values of said first and second measured corrections at said first and second correction planes; and
   (d) effecting said second values of said first and second measured corrections to said rotor at said first and second correction planes.

2. A method of balancing a rotor according to claim 1 wherein said rotor comprises a shaft having first, second and third correction lands disposed at said first, second and third correction planes, respectively, and said method further comprises effecting said first, second and third corrections by adding mass to said rotor at said first, second and third correction lands, respectively.

3. A method of balancing a rotor according to claim 1 wherein said rotor comprises a shaft having first, second and third correction lands disposed at said first, second and third correction planes, respectively, and said method further comprises effecting said first, second and third corrections by removing mass from said rotor at said first, second and third correction lands, respectively.

4. A method of balancing a rotor according to claim 1 wherein said third correction plane is determined by selecting a plane of said rotor disposed nearer to one of said first and second correction planes than to the other thereof.

5. A method of balancing a rotor according to claim 1 wherein said predetermined unbalance of said rotor is due to a bow of said rotor.

6. A method of balancing a rotor according to claim 1 wherein said rotor comprises a hollow shaft and said predetermined unbalance of said rotor is due to variation in thickness of said shaft.

7. A method of balancing a rotor according to claim 1 wherein:
   said rotor comprises a shaft connectable at first and second connections to adjacent members;
   at least one of said first and second connections is effective for causing a centerline of said rotor to tilt relative to said axis of rotation; and
   said predetermined unbalance of said rotor is due to said tilt.

8. A method of balancing a rotor according to claim 1 wherein said predetermined mode shape is associated with a first natural resonance of said rotor and has an arcuate profile with an antinode of maximum amplitude.

9. A method of balancing a rotor according to claim 1 wherein said rotor has a first natural resonance at a first speed and a first mode shape associated therewith, and a second natural resonance at a second speed greater than said first speed and a second mode shape associated therewith, said second mode shape including two spaced antinodes of maximum amplitude, and wherein said predetermined mode shape is said second mode shape.

10. A rotor for a gas turbine engine balanced using the method of claim 1.

11. A method of balancing a rotor according to claim 1 wherein said third correction plane is determined by selecting a plane of said rotor disposed near an antinode of said predetermined mode shape.

12. A method of balancing a rotor according to claim 11 wherein said predetermined unbalance of said rotor is due to a bow of said rotor.

13. A method of balancing a rotor according to claim 1 wherein said rotor includes an annular flange and said predetermined unbalance is due to eccentricity of said flange relative to said axis of rotation.

14. A method of balancing a rotor according to claim 13 wherein said third correction plane is determined by selecting a plane of said rotor disposed nearer to said flange and said second correction plane than to said first correction plane.

15. A method of balancing a rotor according to claim 1 further comprising the step of determining said predetermined unbalance and said predetermined mode shape.

16. A method of balancing a rotor according to claim 15 wherein said predetermined unbalance is determined by measurement of runout to determine a generic unbalance of said rotor, and said predetermined mode shape is determined analytically.

17. A method of balancing a rotor according to claim 1 wherein said Balancing Rule and said predetermined proportion include a Balancing Factor $K_3$ which is determined by the steps of:

(e) simulating said low-speed balancing sequence (a) to obtain first values of said first and second measured corrections $(M_1)_1$ and $(M_2)_1$, respectively, required to balance said rotor due to said predetermined unbalance of said rotor;

(f) selecting a first value of said Balancing Factor $(K_3)_1$ and calculating a first value of said third correction $(C_3)_1$ using said Balancing Rule on at least one of said simulated first values of said first and second measured corrections $(M_1)_1$ and $(M_2)_1$;

(g) adding said first value of said third correction $(C_3)_1$ to said predetermined unbalance of said rotor;

(h) repeating step (e) to obtain second values of said first and second measured corrections $(M_1)_2$ and $(M_2)_2$, respectively, required to balance said rotor due to said predetermined unbalance of said rotor and said calculated first value of said third correction $(C_3)_1$;

(i) adding said second values of said first and second measured corrections $(M_1)_2$ and $(M_2)_2$ and said calculated first value of said third correction $(C_3)_1$ to said predetermined unbalance of said rotor to define a reference rotor balanced for said predetermined unbalance;

(j) calculating a first value of a dynamic response parameter of said rotor due to said predetermined mode shape;

(k) selecting a second value of said Balancing Factor $(K_3)_2$ different from said first reference value of said Balancing Factor $(K_3)_1$ and calculating a second value of said third correction $(C_3)_2$;

(l) repeating steps g, h, i and j using said second calculated value of said third correction $(C_3)_2$ instead of said first calculated value of said third correction $(C_3)_1$ to obtain a second value of said dynamic response parameter of said reference rotor due to said predetermined mode shape; and (m) determining said Balancing Factor $K_3$, which results in said rotor wherein said dynamic response parameter has a value of zero.

18. A rotor for a gas turbine engine balanced using the method of claim 17.

19. A method of balancing a rotor according to claim 17 wherein said predetermined unbalance of said rotor is represented by a distribution $U_s$ of discrete masses $W_s$ spaced along said axis of rotation of said rotor at distances $X_s$ from a reference plane, with each mass $W_s$ being disposed at a radius $E_s$ from said axis of rotation.

20. A method of balancing a rotor according to claim 19 wherein said predetermined unbalance includes a total force unbalance F represented as $$F = \Sigma U_s$$

and a total moment unbalance T represented as $$T = \Sigma U_s X_s$$

where $$U_s = W_s E_s;$$

and said first and second measured corrections $M_1$ and $M_2$ are determined as follows:

$$M_1 = -F(Z_2 - Z_r)/(Z_2 - Z_1)$$

$$M_2 = -F(Z_1 - Z_r)/(Z_1 - Z_2)$$

where $$Z_r = T/F$$

and $Z_r$ is a resultant location of said predetermined unbalance measured relative to said reference plane, $Z_1$ is the location of said first correction plane relative to said reference plane, and $Z_2$ is the location of said second correction plane relative to said reference plane.

21. A method of balancing a rotor according to claim 19 wherein said predetermined mode shape is represented by a distribution $Y_s$ of said discrete masses $W_s$ comprising the distance from said axis of rotation to a displaced longitudinal centerline of said rotor due to said natural resonance and wherein said dynamic response parameter of said rotor due to said mode shape is represented by:

$$R = \Sigma B_s Y_s$$

where $$B_s = U_s + C_n$$

and $C_n$ represents corrections added to said predetermined unbalance at said first correction plane location $Z_1$, said second correction plane location $Z_2$, and at a third correction plane location $Z_3$ associated with said third correction $C_3$, and $C_1 = M_1$ and $C_2 = M_2$.

22. A method of balancing a rotor according to claim 17 further comprising only three corrections and three correction planes and wherein said Balancing Rule for obtaining said third correction includes a relation of said first and second measured corrections as follows:

$$C_3 = K_3(f_1(M_1)_1 + f_2(M_2)_1)$$

wherein $C_3$ is said third correction, $K_3$ is a predetermined Balancing Factor, and $f_1$ and $f_2$ are preselected given values.

23. A rotor for a gas turbine engine balanced using the method of claim 22.

24. A method of balancing a rotor according to claim 22 wherein said rotor includes a flange at one end thereof; said second correction plane is disposed near said flange; said third correction plane is disposed nearer to said second correction plane than to said first correction plane; and said factor $f_2$ is greater than said factor $f_1$.

25. A rotor for a gas turbine engine balanced using the method of claim 24.

26. A method of balancing a rotor according to claim 22 wherein said values of $f_1$ and $f_2$ are selected based on the influence of said third correction relative to said first and second corrections.

27. A method of balancing a rotor according to claim 26 wherein said values of $f_1$ and $f_2$ are directly proportional to the distances between said second correction plane and said third correction plane, and between said first correction plane and said third correction plane, respectively.

28. A method of balancing a rotor according to claim 27 wherein said determining step (m) is accomplished by using a Newton-Raphson iteration closure technique.

29. A method of balancing a rotor according to claim 17 wherein said effecting step (b) further comprises effecting at a third correction plane a third correction to said rotor and at a fourth correction plane a fourth correction to said rotor, which first and second corrections are predetermined proportions of at least one of said first and second measured corrections and include said Balancing Factor $K_3$ and a Balancing Factor $K_4$, and said proportions being predetermined to correct for two combinations of said predetermined unbalance of said rotor and said predetermined mode shape of said rotor associated with a speed of said rotor greater than said test speed without actually rotating said rotor to said greater speed to measure unbalance; and further including (n) conducting said steps (e) through (j) separately for both said Balancing Factor $K_3$ and said Balancing Factor $K_4$, instead of $K_3$, each using different ones of said two combinations of predetermined unbalance and mode shape for obtaining first values of said first and second dynamic response parameters $(R_1)_1$ and $(R_2)_1$ for said first values of said Balancing Factors $(K_3)_1$ and $(K_4)_1$;

(o) conducting steps (k) and (l) separately for a second value of said Balancing Factor $(K_3)_2$ while using said first value of said Balancing Factor $(K_4)_1$ and using said different ones of said two combinations of predetermined unbalance and mode shape for obtaining second values of said first and second dynamic response parameters $(R_1)_2$ and $(R_2)_2$;

(p) conducting steps (k) and (l) separately for a second value of said Balancing Factor $(K_4)_2$ while using said first value of said Balancing Factor $(K_3)_1$ and using said different ones of said two combinations of predetermined unbalance and mode shape for obtaining third values of said first and second dynamic response parameters $(R_1)_3$ and $(R_2)_3$; and wherein said determining step (m) further includes determining said Balancing Factors $K_3$ and $K_4$ which result in said rotor having values of said first and second dynamic response parameters of zero for both said two combinations of said predetermined unbalance and mode shape.

30. A rotor for a gas turbine engine balanced using the method of claim 29.

31. A method of balancing a rotor according to claim 29 wherein said third correction plane is disposed nearer to said first correction plane than to said second correction plane, and said fourth correction plane is disposed nearer to said second correction plane than to said first correction plane, and wherein said third and fourth corrections are related to said first and second measured corrections in two of said Balancing Rules as follows:

$$C_3 = K_3 M_1$$

and $$C_4 = K_4 M_2.$$

32. A method of balancing a rotor according to claim 31 wherein said determining step (m) is accomplished by using a Newton-Raphson iteration closure technique.

33. A method of balancing a rotor according to claim 32 wherein said first combination of said predetermined unbalance and said mode shape is bow of said rotor and a mode shape associated with a first natural resonance of said rotor; and said second combination of said predetermined unbalance and said mode shape is a lump mass in said rotor and said mode shape of said rotor associated with said first natural reasonance of said rotor.

34. A method of balancing a rotor according to claim 33 wherein said second and fourth correction planes are disposed at one end of said rotor adjacent to said flange and said first and third correction planes are disposed at an opposite end of said rotor.

35. A method of balancing a rotor according to claim 34 wherein said first, second, third and fourth corrections are made by removing material from said rotor at said first, second, third and fourth correction planes, respectively, and said Balancing Factor $K_3$ is within a range of about 95%–105% and said Balancing Factor $K_4$ is within a range of about 95%–105%.

36. A rotor for a gas turbine engine balanced using the method of claim 35.

37. A rotor comprising:
a shaft having first, second, and third spaced correction lands;
said first, second, and third correction lands being sized and configured to effect first, second and third corrections to said rotor for balancing said rotor at a first speed;
said third correction being proportional to a first combination of a predetermined unbalance of aid rotor and a predetermined mode shape of aid rotor; and
said first and second corrections being proportional to unbalance of said rotor and said third correction.

38. A rotor according to claim 37 further comprising a fourth correction land, said first, second, third and fourth correction lands being sized and configured for effecting first, second, third and fourth corrections to said rotor for balancing said rotor at said first speed, said fourth correction being proportional to a second combination of a predetermined unbalance of said rotor and a predetermined mode shape of said rotor and said first and second corrections being proportional to unbalance of said rotor and said third and fourth corrections.

39. A rotor according to claim 38 wherein said first combination of said predetermined unbalance and said mode shape is bow of said rotor and a mode shape associated with a first natural resonance of said rotor; and said second combination of said predetermined unbalance and said mode shape is a lump mass in said rotor associated with a flange of said rotor and said mode shape associated with said first natural resonance of said rotor.

40. A rotor according to claim 39 wherein said second and fourth correction lands are disposed at one end of said rotor adjacent to said flange and said first and third correction lands are disposed at an opposite end of said rotor.

41. A rotor according to claim 40 wherein said first, second, third and fourth correction lands each include a region of material removal for effecting said first, second, third and fourth corrections.

* * * * *